United States Patent [19]

Thuillier et al.

[11] Patent Number: 4,864,456

[45] Date of Patent: Sep. 5, 1989

[54] METHOD OF MANUFACTURING A LIGHTNING ARRESTER AND A LIGHTNING ARRESTER OBTAINED BY THE METHOD

[75] Inventors: Denis Thuillier, Vichy; Guy Thevenet, Le Bourg Beaumont Les Randan, both of France

[73] Assignee: Sediver, Courbevoie, France

[21] Appl. No.: 224,146

[22] Filed: Jul. 26, 1988

[30] Foreign Application Priority Data

Aug. 6, 1987 [FR] France ................................ 87 11201

[51] Int. Cl.[4] ................................................ H02H 9/04

[52] U.S. Cl. ..................................... 361/126; 361/127; 338/21

[58] Field of Search ............... 361/117, 118, 126, 127, 361/132; 174/140 R, 150, 2; 338/21, 71, 99, 113, 317-320

[56] References Cited

U.S. PATENT DOCUMENTS

| | | | |
|---|---|---|---|
| 3,698,920 | 10/1972 | Pitha | 361/117 X |
| 4,404,614 | 9/1983 | Koch et al. | 361/128 |
| 4,450,426 | 5/1984 | Miyoshi et al. | 361/127 X |
| 4,656,555 | 4/1987 | Raudabaugh | 361/117 |

FOREIGN PATENT DOCUMENTS

| | | |
|---|---|---|
| 898603 | 7/1949 | Fed. Rep. of Germany . |
| 3544141 | 6/1986 | Fed. Rep. of Germany . |

*Primary Examiner*—Todd E. DeBoer
*Attorney, Agent, or Firm*—Kenyon & Kenyon

[57] ABSTRACT

A lightning arrester includes a stack of zinc oxide pellets (1) seated in counterbored recesses of intermediate tubular spacers (2) and two metal end fittings (3). This assembly is wrapped in a filament winding (4) at an angle of 80–90 degrees with the stack axis, thereby providing radial binding without significant axial compression. The filament winding adheres to the side surfaces of all the components of the stack.

8 Claims, 1 Drawing Sheet

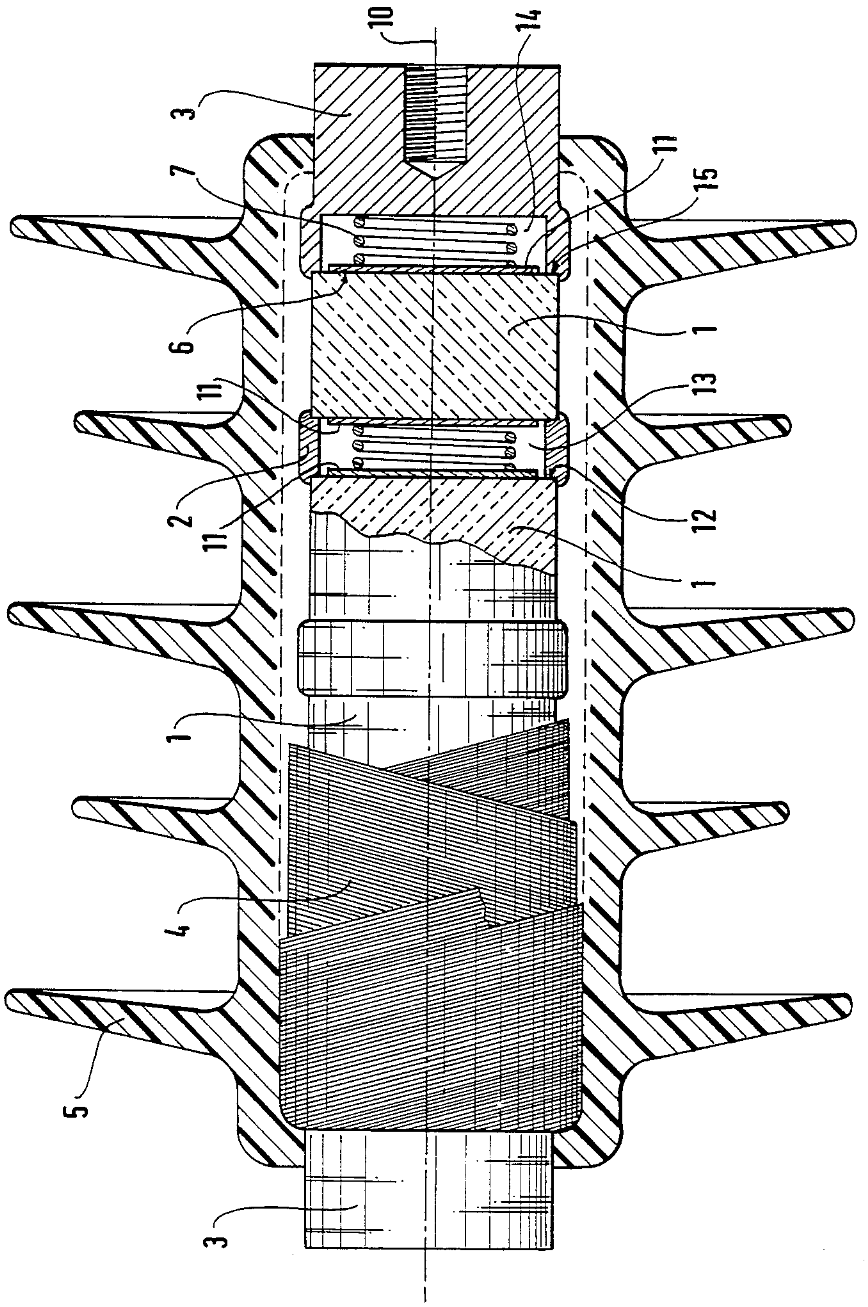
10
14
3
11
15
7
6
1
11
13
2
11
12
1
1
4
5
3

METHOD OF MANUFACTURING A LIGHTNING ARRESTER AND A LIGHTNING ARRESTER OBTAINED BY THE METHOD

The present invention relates to a method of manufacturing a lightning arrester and to a lightning arrester made by the method.

BACKGROUND OF THE INVENTION

A lightning arrester is a device which is placed between a phase and ground in a high tension line, and which serves to limit the amplitude and the duration of atmospheric over-voltages (surges due to lightning and to induction phenomena in the conductors), or to temporary electric overvoltages on the grid (operating surges).

The functions of a lightning arrester are firstly to withstand normal operating tension on a permanent basis, and secondly to pass the high discharge current which appears during a temporary surge, thereby protecting line apparatuses (transformers, . . . ).

These functions are generally provided by a core made of a material of the varistor type and based, for example, on zinc oxide (ZnO) whose electrical resistivity is highly nonlinear as a function of applied voltage.

This nonlinear characteristic enables such a lightning arrester to pass:

a low current (e.g. about 0.5 $mA/cm^2$) when the operating voltage is applied on a permanent basis to the lightning arrester, which then presents a very high resistance; this current is essentially capacitive in origin since the relative permitivity of such varistors is very high; or a high current, which may be as high as several tens of kiloamps, when the applied voltage reaches a trigger threshold above which the resistance of the varistor becomes very low.

Various lightning arrester structures are known which implement a central core comprising a stack of a plurality of cylindrical pellets made of varistor type material, together with two metal end fittings which are in electrical contact with the pellets, e.g. via springs.

In a prior art manufacturing method described in U.S. Pat. No. 4 656,555, a stack is made of the pellets and the end fittings including very strong interposed springs by applying considerable compression, up to as much as severan tens of $kg/cm^2$, along the axial direction of the stack. Thereafter a winding of resin-impregnated glass fiber filaments is made around the assembly compressed in this way. The winding is made at a very small angle relative to said axis. The fiber is tensioned successively over a shoulder on one of the end fittings then over the corresponding shoulder on the opposite end fitting. Such a winding is mechanically very strong in the longitudinal direction and is intended to counterbalance the pre-stress induced in the stack of pellets prior to and during winding. This strength for withstanding such longitudinal prestress necessarily implies that shear stresses are set up at the interface between the stack of pellets and the envelope constituted by the winding of filaments under tension, in particular when temperature variations occur, since the materials constituting the assembly have very different mechanical characteristics. The locations where the envelope leaves the stack can then become seats of partial electrical discharge or of sufficient arcing activity to degrade or even completely short circuit the assembly in the more or less long term.

The object of the present invention is to implement a method of manufacturing a lightning arrester which provides a product that is more reliable than the prior art lightning arrester.

SUMMARY OF THE INVENTION

The present invention provides a method of manufacturing a lightning arrester in which a stack is initially formed of pellets made of a varistor type material, together with spacers and metal end fittings, and including means for providing electrical continuity between the two end fittings, after which a filament is wound around said assembly, which methods includes the following steps:

the spacers are selected to be tubular, with electrical connection means between metal-coated faces of pairs of adjacent pellets being provided inside the spacers;

said stack is mounted in a device for performing said filament winding in such a manner as to ensure solely that all of the component parts of the stack remain properly aligned;

said filament winding of resin impregnated glass fibers is performed in such a manner as to provide adherization to and radial binding of said stack within significant longitudinal compression; and after the resin to the envelope formed in this way has been polymerized, a coating of EPDM type material is injected thereover.

The filament winding thus has the sole function of holding the pellets together since it is very adhesive both with respect to the side surfaces of the pellets and with respect to the side surfaces of the spacers, and since it is mechanically very strong in the radial direction. The angle of the turns is very open relative to the axis of said stack. Thus, the winding angle relative to the overall axis may lie in the range 80° to 90°.

In a preferred implementation, the spacers are selected to be tubular and electrical connection means are disposed inside the spacers for providing electrical connection between metal-coated faces of two adjacent pellets. In addition, the spacers include openings for guiding said pellets radially.

Said electrical connection means comprise, for example, a low pressure spring associated with metal plates applied against respective ones of said metal-coated faces.

In an equivalent variant, said electrical connection means comprise a wire welded to metal plates which are applied against respective ones of said metal-coated faces.

The invention also provides a lightning arrester comprising a stack of pellets of varistor type material together with spacers and metal end fittings, and an envelope of resin-impregnated glass fibers, wherein said spacers are tubular, wherein the spacers and the metal end fittings include means located in internal housings for ensuring electrical connection along the entire stack, wherein said envelope provides radial binding for said stack significant axial compression, but with adherence to the side surfaces of said pellets, of said spacers, and of said end fittings, and wherein said envelope is provided with a coating of fins made of injected elastomer.

BRIEF DESCRIPTION OF THE DRAWING

An implementation of the invention is described by way of example with reference to the sole FIGURE of the accompanying drawing, which is a diagrammatic fragmentary section view through a lightning arrester in accordance with the invention.

MORE DETAILED DESCRIPTION

We begin with two metal end fittings 3 and a set of zinc oxide pellets 1 which are metal coated on their plane faces 6. A stack is made on a common axis 10 with tubular spacers 2 being interposed between the pellets 1, said spacers being either metal or insulating. The spacers have counterbored recesses 12 at the opposite ends of internal housings 13 for radially guiding the pellets 1. Similarly, each end fitting 3 includes an internal housing 14 with a counterbored recess 15.

In order to provide electrical continuity, metal plates 11 are placed in the housings 13 and 14 in contact with the metal coated faces 6 of the pellets 1 and in conjunction with low force springs 7.

This entire assembly is put into a device for providing a filament winding. The winding operation is performed by winding one or more layers of resin-impregnated glass fibers 4 around the stack so as to bind it radially. The winding angle relative to the axis 10 is very open. It lies in the range 80° to 90°. The envelope formed in this way adheres perfectly to the side surfaces of the end fittings 3, of the spacers 2, and of the pellets 1. It provides no significant axial compression on the assembly.

During winding, the spacers 2 perform a sealing function and prevent the resin with which the fibers 4 are impregnated from infiltrating between the pellets 1. These spacers may be made of a resin analogous to that of the impregnating resin so as to further enhance adhesion of the envelope.

After the envelope has polymerized, a coating of elastomer fins 5 is injected thereabout, with the elastomer being EPDM, for example.

This mechanical connection between the envelope and the stack is totally independent of the electrical connection means between the pellets, and between the pellets and the two end fittings 3.

Naturally, the invention is not limited to the above-described embodiment. In particular, without going beyond the scope of the invention, any means could be replaced by equivalent means. Thus, the low-force spring serving as an electrical connection between a pair of plates 11 could be provided by an electric wire welded at each end to one of the plates 11.

We claim:

1. A method of manufacturing a lightning arrester by assembling a stack of pellets made of a varistor type material separated by spacers and terminated by two metal end fittings, providing electrical connections between successive pellets and between the end pellets and the two end fittings, and winding a filament around said stack, wherein the method includes the following steps:

selecting the spacers to be tubular and providing said electrical connections between metal-coated faces of pairs of adjacent pellets inside the spacers;

performing said filament winding with resin impregnated glass fibers in such a manner as to ensure that all of the component parts of the stack remain properly aligned and the resin impregnated glass fibers adhere to and radially bind said stack without imposing significant longitudinal compression;

polymerizing the resin in the impregnated glass fibers; and injecting a coating of EPDM type material over the polymerized glass fiber winding.

2. A manufacturing method according to claim 1, wherein the winding angle relative to the axis of the stack lies in the range 80° to 90°.

3. A manufacturing method according to claim 1, wherein said spacers have counterbored recesses for radially guiding said pellets.

4. A manufacturing method according to claim 1, wherein said electrical connections are provided by a low force spring associated with metal plates which are applied against respective ones of said metal-coated faces of each pair of adjacent pellets.

5. A manufacturing method according to claim 1, wherein said electrical connections are provided by a wire welded to metal plates applied against respective ones of said metal-coated faces of each pair of adjacent pellets.

6. A lightning arrester made by the method of claim 1.

7. A lightning arrester comprising a stack of pellets of varistor type material separated by spacers and terminated by metal end fittings, and an envelope of resin-impregnated glass fibers, wherein said spacers are tubular, wherein the spacers and the metal end fittings include means located in internal housings for ensuring electrical connection along the entire stack, wherei said envelope provides radial binding for said stack without significant axial compression but with adherence to the side surfaces of said pellets, of said spacers, and of said end fittings, and wherein said envelope is provided with a coating of fins made of injected elastomer.

8. A lightning arrester according to claim 7, wherein the fibers of the envelope are wound at an angle, relative to the axis of said stack, that lies in the range of 80° to 90°.

* * * * *

UNITED STATES PATENT AND TRADEMARK OFFICE
CERTIFICATE OF CORRECTION

PATENT NO. : 4,864,456

DATED : September 5, 1989

INVENTOR(S) : Denis THUILLIER, Guy THEVENET

It is certified that error appears in the above-identified patent and that said Letters Patent is hereby corrected as shown below:

Column 1, line 49: Change "severan" to --several--.

Column 2, line 15: Change "methods" to --method--.

Column 2, line 61: After "stack" insert --without--.

Column 4, line 42: Change "wherei" to --wherein--.

Signed and Sealed this

Twenty-fourth Day of July, 1990

*Attest:*

HARRY F. MANBECK, JR.

*Attesting Officer*

*Commissioner of Patents and Trademarks*